United States Patent Office

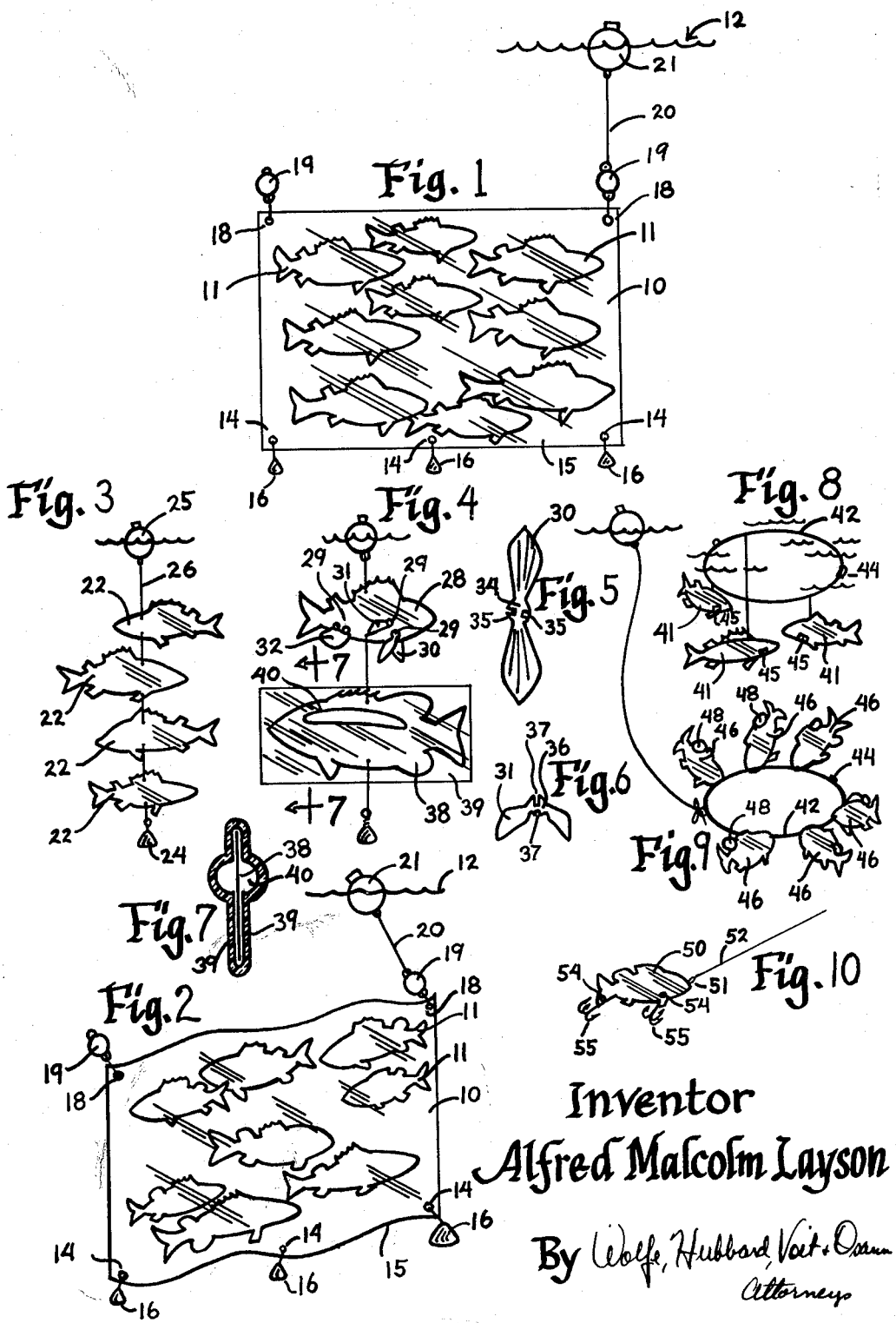

3,186,120
Patented June 1, 1965

3,186,120
DECOYS
Alfred M. Layson, 2930 E. Bonnie Brook, Waukegan, Ill.
Filed Dec. 8, 1961, Ser. No. 157,948
2 Claims. (Cl. 43—2)

The present invention relates to decoys and more particularly to decoys of the type finding particular, but not necessarily exclusive use for the sport of fishing.

The principal aim of the invention is to decoy fish and bring them into the fishing area. Accordingly, one object of the invention is to provide an improved decoy for fishing.

A more specific object is to provide an improved decoy for fishing which has a natural life-like appearance and movement in the water so that fish are attracted to the area around the decoy.

Another object of the present invention is to provide a decoy of the foregoing type which is useful for ice fishing in that it is flexible under all temperature conditions and can be easily inserted through the hole in the ice used for fishing.

A further object of the present invention is to provide a decoy of the foregoing type which can be used at any desired depth and which can be used in water which is relatively still as well as in water which is rapidly moving.

Still another object of the invention is to provide a decoy of the foregoing character which can be easily stored when not in use, is made of a light inexpensive material, and is durable and rugged so that it has a substantial life.

Other objects and advantages of the present invention will become apparent as the following description proceeds, taken in connection with the accompanying drawing wherein:

FIGURE 1 is an elevation view of a decoy embodying the present invention.

FIG. 2 is an elevation view of the decoy shown in FIG. 1 but illustrating the natural life-like movement of the same as produced by currents of water.

FIG. 3 is a modified form of the invention illustrating the decoy as embodying a plurality of separate elements.

FIG. 4 is still another modification of the present invention illustrating a plurality of decoys having a three dimensional effect.

FIGS. 5 and 6 illustrate portions of the decoy to be used in the three dimensional effect shown in FIG. 4.

FIG. 7 is a section view taken substantially in the plane of line 7—7 on FIG. 4.

FIG. 8 is still another modified form of the invention illustrating the decoy as a plurality of separate elements attached to a floating ring.

FIG. 9 is a modification of the invention similar to that shown in FIG. 8 but illustrating the plurality of decoys attached to a weighted ring.

FIG. 10 is a further modification of the invention illustrating its use as a lure.

While certain illustrative forms and modifications of the invention have been shown in the drawing and will be described below in considerable detail, it should be understood that there is no intention to limit the invention to the specific form disclosed. On the contrary, the intention is to cover all modifications, alternative constructions, equivalents and uses falling within the spirit and scope of the invention as expressed in the appended claims.

One illustrative form of fishing decoy embodying the invention is shown in FIGS. 1 and 2 of the drawing and comprises a sheet of transparent waterproof flexible plastic film 10 having a glossy surface and carrying a plurality of fish-like images 11 arranged thereon in the manner of a school of fish. These images may be, for example, photographic reproductions of fish embedded in the film or may be printed reproductions applied by any suitable printing process to one or both surfaces of the sheet. These images, moreover, may be life-like fish reproductions or may be fanciful fish-like pictures of a character calculated to attract the attention of live fish.

In order to position the decoy 10 beneath the surface of a body of water, indicated generally at 12, so that the images 11 appear in their natural habitat, means, such as holes or grommets 14, are provided along one edge 15 of the sheet which serves as the bottom of the decoy. To these grommets are mounted lead sinkers such as bell sinkers 16 which are heavy enough to pull the sheet 10 beneath the surface 12 of the water.

Means are provided for holding the sheet 10 upright in the water so that the images 11 appear as a natural school of fish. One illustrative means comprises grommets or holes 18 in the upper edge of the sheet 10 to which is attached floats such as plastic bubbles 19. It is necessary, of course, that these floats simply hold the sheet upright but do not lift it to the surface. By balancing the size of the floats 19 with the size of the weights 16 it is possible to suspend the decoy sheet 10 at any desired position in the body of water being fished.

In order to retrieve the decoy, a line 20 and buoy 21 is attached thereto at any convenient point such as at one of the floats 19. This buoy will indicate the position of the decoy and the line 20 will serve as a retrieving line by means of which the decoy can be withdrawn when desired.

In order to give the fish-like images 11 a natural appearance and movement, the sheet 10 must be thin enough so as to be moved under the influence of water currents. It has been found, for example, that acetate plastic film having a thickness between two mils (0.002″) and about ten mils (0.010″) and preferably in the vicinity of about five mils (.005″) is suitable for this purpose. This film has sufficient strength and waterproof properties as well as a desirable glossy surface to give to the decoy a natural, life-like appearance. One illustrative material which has been employed is polyvinyl acetate sold by Eastman Kodak Co. as "Clear Special Grade K4."

The natural movement of the sheet 10 and the images 11 thereon is shown in FIG. 2. The rippling of the plastic film under the influence of water currents causes the images 11 to ripple and thereby appear as a moving fish. The positioning of the images 11 on the sheet is not critical. The school of fish may be all headed in one direction, as shown in FIG. 1, or in a plurality of directions as shown in FIG. 2. The natural appearance and movement of these images is achieved by means of a thin flexible plastic film as described, together with the plurality of weights 16 attached along the lower edge and the floats 19 attached to the upper edge of the sheet. In rapidly moving water, the decoy 10 could be used by attaching a float 19 at one upper corner and a weight at the adjacent lower corner, and allowing the stream or current to pull the film and ripple it in a natural manner. The decoy can be attached either to a buoy float 21, as shown in FIGS. 1 and 2, or to a permanent mounting such as a boat or, when used in a stream or river, to a stake or branch on the bank of the water.

It will also be understood that the size and shape of the sheet embodying the decoy 10 depends on the location being fished and upon the number of images which it is wished to provide, and those skilled in the art will be able to make the necessary variations to suit the conditions under which the decoy is used.

A modified form of the invention is shown in FIG. 3. In this form, a plurality of thin flexible plastic sheets, cut to the shape of the image, are provided and are indicated generally at 22. These sheets have the image printed or embedded directly thereon and are fastened together in a series, either vertically or horizontally. In the modification shown in FIG. 3, the series of flexible images 22 is fastened together in a vertical series with a weight or sinker 24 at the lower end of the series and a float 25 at the upper end, the images and float and sinker being attached together by means of a flexible line 26. This line may be continuous, or tied between each flexible sheet decoy.

Still a further modification of the invention is shown in FIG. 4. This modification is similar to that shown in FIG. 3 except that the decoys are of a somewhat modified form. One form of decoy shown in FIG. 4 embodies a three dimensional effect. To this end a decoy 28, formed on a thin flexible sheet of the character described above, is provided with a plurality of apertures 29 through which fish-like fins 30, 31, 32 are mounted. Illustrative types of fins are shown in FIGS. 5 and 6. In the fin shown in FIG. 5 and indicated at 30 there is provided an elongated strip of the plastic, which may be of the same character as that from which the decoy is made, having a central portion 34 provided with a pair of opposed notches 35 which, when the fin 30 is mounted in the decoy 28 engage the decoy sheet and hold the fin in place. A similar construction is shown in FIG. 6 for a fin of the nature indicated at 31 in FIG. 4. This fin also is provided with an enlarged central portion 36 and notches 37. To mount the fins such as shown in FIGS. 5 and 6 in place, they are rolled so as to pass through the holes 29 provided in the decoy 28. When half of the fin is passed, the fin is allowed to unroll so that the sheet of the decoy 28 is engaged in the notches 35. The projecting fins thereby give a natural three dimensional effect to the decoy. The water moves these fins to give the illusion that the decoy fish is alive.

Still a further modified form of decoy is shown in FIGS. 4 and 7 and comprises a fish-like image 38 embedded between two sheets of plastic 39 in such a manner as to leave a bubble 40 which will also serve as a float. It is necessary, of course, that the sheets be sufficiently thin and flexible so as to provide a natural movement to the decoy as described above.

Additional modified forms of the invention are shown in FIGS. 8 and 9. Referring to FIG. 8, decoys 41 formed, in the manner described above, of thin flexible, waterproof film material having a fish-like image thereon, are attached to a ring or float 42 of a character such that it floats on the surface of the water. For example, such a float can comprise a hollow tube 42 having a seal 44 at one point thereon. By draining any water from the tube 42 and then closing the seal 44, the tube will float on the water as shown in FIG. 8. Alternatively, by filling the tube 42 with water through the seal 4, it will sink as shown in FIG. 9. When the ring is to be used as a float on the surface the decoys 41 will each be provided with a small weight 45 so that they depend from the ring and are, in effect, suspended in the water. Alternatively, when the ring is to be used as a sinker or weight decoys 46, as shown in FIG. 9, will each be provided with a float 48 either attached thereto or formed as an integral part thereof as described above in connection with FIGS. 4 and 7. Also, when used as a weight the ring 42 may be filled with a heavy solid such as sand, or may be a heavy material such as lead or like heavy material.

Turning to FIG. 10, still a further modification of the invention is there shown involving the use of a decoy constructed as described above of thin flexible, waterproof film material having a fish-like image thereon, together with hooks and a line for use as a lure. This can be accomplished by forming a decoy 50, as described above, and providing the same with means such as a grommet 51 for attaching a line 52, and means such as grommets or the like 54 for attaching hooks 55. As the lure moves through the water, water currents impinging thereon will cause the flexible material from which it is made to move or wriggle thereby imparting a life-like movement to the lure.

When a decoy such as is shown in FIGS. 1 and 2 is to be used for ice fishing it is a simple matter to roll the sheet of film into a small tube and then insert it through the hole cut in the ice. In the water it will unroll naturally under the influence of water currents inasmuch as it attached only at one upper corner to a retrieval float or buoy.

The use of a decoy sheet formed of transparent flexible glossy plastic film has been found not only to impart a life-like appearance and movement to the fish images printed thereon, but also the sheet is substantially invisible in the water and it has been found through actual trials that it attracts fish rather than frightening them.

I claim as my invention:

1. A fishing decoy comprising a sheet of transparent waterproof flexible plastic film having a generally quadrangular shape and a glossy surface with a plurality of fish-like images thereon, weight means affixed to the lower edge of said sheet to hold the same underwater, and float means affixed to the upper edge of said sheet in substantially vertical alignment with said weight means so that said sheet is held in a generally vertical plane upright in the water, the total buoyancy of said sheet, weight means, and float means being less than one so that the decoy remains submerged in the water, said weight and float means being so affixed to the sheet as to permit unimpaired flexure of the sheet due to external forces acting thereon, and said sheet having a thickness within the range of about 0.002 to 0.010 inch so that it is thin and flexible enough to move in response to water currents whereby a life-like rippling movement is imparted to the fish-like images on the sheet.

2. A fishing decoy as defined in claim 1 which includes a buoy and a retrieving line connecting said buoy to an upper portion of the decoy.

References Cited by the Examiner

UNITED STATES PATENTS

| 255,671 | 3/82 | Reynolds | 43—10 |
|---|---|---|---|
| 1,787,726 | 1/31 | Heddon et al. | 43—42.25 X |
| 1,874,102 | 8/32 | Jacobs | 43—42.13 |
| 1,921,176 | 8/33 | Unkefer | 43—42.33 |
| 2,054,407 | 9/36 | Campbell | 43—27.4 |
| 2,616,559 | 11/52 | Hyland | 43—42.53 X |
| 2,848,835 | 8/58 | Witt | 43—42.74 |
| 2,933,847 | 4/60 | Frasure | 43—42.74 |

FOREIGN PATENTS

| 25,555 | 11/07 | Great Britain. |
|---|---|---|
| 32,610 | 7/21 | Norway. |

ABRAHAM G. STONE, *Primary Examiner.*